Nov. 24, 1970 T. B. WESTFALL ET AL 3,542,970

CROSSBAR SWITCHING SYSTEM WITH RELATIVELY UNIFORM GROWTH CHARACTERISTICS

Filed April 28, 1967 3 Sheets-Sheet 1

INVENTOR
T. B. WESTFALL
BY R. Y. SIMS

ATTORNEY 3,542,970

CROSSBAR SWITCHING SYSTEM WITH RELATIVELY UNIFORM GROWTH CHARACTERISTICS

Ted B. Westfall, Bronxville, N.Y., and Robert Y. Sims, Hato Rey, Puerto Rico, assignors to International Telephone and Telegraph Corporation, New York, N.Y., a corporation of Delaware Filed Apr. 28, 1967, Ser. No. 634,615
Int. Cl. H04q 3/42
U.S. Cl. 179—22 3 Claims

ABSTRACT OF THE DISCLOSURE

A plurality of crossbar switches are arranged in cascaded stages to provide a switching network. The crossbar switch verticals are cut to provide a number of isolated crosspoint sections. One crosspoint section provides network inlets, and another crosspoint section provides network outlets distributed in a predetermined ratio. Thus, every switch that is added to the network simultaneously adds a number of inlets, outlets, and connections therebetween. This way, a predetermined ratio of inlets, outlets, and connecting paths are maintained at all times.

This invention relates to crossbar switching networks and more particularly to systems which may be designed or installed with a given amount of switching capacity and which may then grow in capacity, with growth occurring in a balanced manner and at a fairly smooth cost per added network inlet.

A "switching network" is a device for selectively extending electrical paths from any inlet to any outlet. In the network, each path is extended through a plurality of cascaded stages by way of a number of switching contact sets commonly called "cross-points." It is not necessary to provide one outlet for every inlet since it is almost certain that no one of the circuits connected to the inlets will demand service all of the time. Quite the contrary, each inlet uses the network during only a small part of the time; therefore, a large number of inlets may share a few outlets—the requirement being only that the number of outlets will be equal to or greater than the number of inlets which are in simultaneous use during a predictable percentage of the time.

Usually, this prediction is made on a basis of traffic studies. The traffic study results in an establishment of ratios of equipments required for any given network. For example, a study might show that one outlet is required for every ten inlets, or fraction thereof. If so, there must be a number of switches arranged to equitably distribute the connections between the inlets and outlets. Again, the number and arrangement of these switches is ascertained from the traffic studies.

For convenience of expression, the term "ratio" is used herein to describe the concept that, for any given system there is a mix of equipments both as to numbers and distribution which are required to make a truly optimum network. The term "ratio" is not intended to cover the numbers and distribution of equipment in any specific system.

The ratio, number, and distribution of the crosspoints and stages is generally fixed by the original network design. Heretofore, it has not been possible to design or install a crossbar system having any arbitrary number of inlets, outlets, crosspoints, and stages calculated to be in the predetermined ratio and still have a system which could be economically changed in size by small increments while maintaining both a relatively uniform number of crosspoints per inlet, the original basic network configuration of interswitch linking, and the original ratio of equipments accessible from the network.

Traditionally, the mechanical constraints upon crossbar switching networks do not permit such a practical growth pattern with optimum uniformity. For example, a network having an optimum growth characteristic would require very small capacity switches combined into many switching stages. However, if conventional crossbar switches are reduced in size to provide small incremental growth of capacity that would maintain the optimum ratio of equipments, the number of magnets, the size of the supporting structure, and the added control circuitry become the controlling criteria of network cost. A truly optimum switch size becomes prohibitively expensive. Heretofore, as a practical matter, the available types of crossbar switches could not economically be reduced to the desired small capacity size required to optimize growth characteristic.

Moreover, it is not economically feasible to vary the capacity of switches after production tooling has been acquired. And, it is very difficult to change the number of stages in a crossbar network after the system is designed since such a change involves the manner in which the common controls operate. Thus, except in large, multithousand line networks, a network designer has heretofore been prevented from approaching optimum switch size and network configuration.

Accordingly, an object of this invention is to provide new and improved crossbar switching networks. More particularly, an object is to provide a crossbar network in almost any size with approximately the optimum ratio in the number and distribution of equipments required by the pertinent network size. In this connection, an object is to provide networks which can be changed in size and configuration to meet almost any growth demands, with the changes being made at a relatively smooth cost per added inlet and a uniform pattern of equipment utilization.

Another object is to provide networks making full use of crossbar switches having split verticals. Here an object is to capitalize on the network flexibility resulting from recent developments which have provided standard size crossbar switches that may, in effect, be made into functional units which are smaller than the functional units using the standard switches.

Still another object is to reduce the cost of crossbar switching networks by making a network well adapted to use of modern computer control designs. For example, an object is to provide switches with the crosspoints inherently associated with each other and with other system equipment in a manner such that network growth occurs at a relatively smooth cost by the simple process of adding new switches, as required, thus tending to eliminate the need for changes in the computer control design.

In accordance with one aspect of this invention, these and other objects are accomplished by an electrical switching network which utilizes a plurality of crossbar switches having split verticals. In effect these vertical splits divide the crosspoints into switching sections which form the desirable small capacity size switches without increasing the switch costs to prohibitive levels. To make full use of the invention, each of these switching sections is arranged to provide the appearances of either lines, trunk or other circuits. Therefore, each switch includes not only a number of inlets, but also all outlets, and other appearances in the desired ratio of appearance numbers which are required to serve that number of inlets. The interswitch cabling extends from vertical to vertical of all crossbar switches in the entire network. Therefore, it becomes practical to increase or decrease the size of the network by the simple expedient of adding or subtracting a few switches because this does not change the ratio of components used in the system. Thus, all appearances are brought together electrically, so as to eliminate most on site cabling regardless of whether the switches are original equipment or add-on equipment. This way, the physical construction is related to the electrical circuitry in a manner which achieves an overall uniformity of growth regardless of network size. For a disclosure of hardware using techniques described herein, reference is made to a recently developed switching system which utilizes crossbar switches having split verticals. For this description please see a co-pending application entitled, "Automatic Switching Matrix," Ser. No. 430,136, filed Feb. 3, 1965 by Erwin, Field and Mahood, and assigned to the assignee of this invention, now Pat. No. 3,441,677.

The above mentioned and other objects and features of this invention and the manner of obtaining them will become more apparent, and the invention itself will be best uderstood by reference to the following description of an embdiment of the invention taken in conjunction with the accompanying drawings, in which:

FIG. 1 is a schematical representation of the mode of completing a path through a prior art crossbar switching network;

FIGS. 2–5 schematically represent a concept of how an improvement may be made over the prior art modes of completing path connections shown in FIG. 1;

Figure 1:
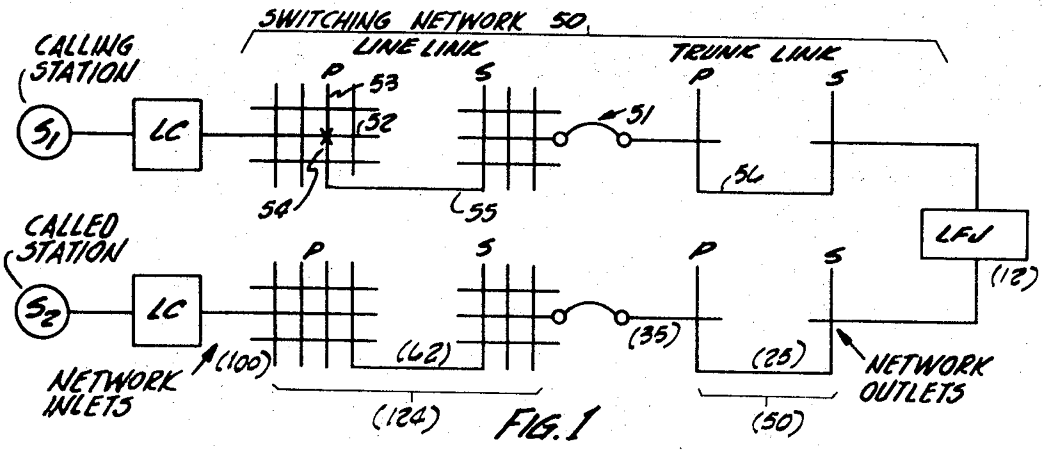

Known crossbar systems may complete switch paths in the manner generally depicted by FIG. 1. This prior art switching network 50 has two sections (here called "Line Link" and "Trunk Link") which are cross-connected at 51 in any convenient wiring pattern. The line link section is where the traffic is least concentrated, and the trunk link section is where it is most concentrated. The subscriber stations S1 and S2 represent any suitable number of stations, each of which is connected via a telephone line and an individually associated line circuit LC to the line link section. The trunks and other control equipment (such as line feed junctor LFJ) are connected to the trunk link section. The points which the lines are connected are generally called "inlets" and the points where the trunks are connected are generally called "outlets".

Those skilled in the art will readily understand the symbology of the network 50. Briefly, each crossbar switch is a matrix having a plurality of coordinate horizontal and vertical multiples (such as 52, 53) arranged to provide intersecting crosspoints (one of which is shown at 54). One coordinate of these multiples (say the horizontals) provides the matrix inlets, and the other coordinate provides the matrix outlets. A number of these matrices are connected in cascade to complete the switching network. These connections are accomplished via inter-matrix wiring, such as 55, 56, sometimes called "links" or "junctors."

The point to be noted from this disclosure of a prior art system is that the numbers of equipments connected to the inlets and outlets, as well as the network crosspoints and other components therebetween, must have some predetermined relationship to each other (please note the numbers in parenthesis near the bottom of certain of the equipment shown in FIG. 1). By way of example, in this purely hypothetical situation, it is assumed that, at the outlets, there are twelve line feed junctors for every one-hundred lines at the inlets. Further, in this particular hypothetical network, there are one hundred and twenty-four verticals in the "Line Link" section and fifty verticals in the "Trunk Link" section. Sixty-two junctors 55 interconnect the "Line Link" verticals, and twenty-five junctors 56 interconnect the "Trunk Link" verticals. The "Line Link" and "Trunk Link" sections are joined together at 51 by thirty-five paths.

Now, suppose that the size of the network increases by ten percent, for example. It is obvious that the lines increase by ten, the line feed junctors by one and two-tenths (rounded to become two), and the remaining components increase comparably. However, in this prior art system, it is not possible to add ten inlets for the lines and two outlets for the line feed junctors, thirteen verticals to the "Line Links," or the other components in such odd values because crossbar switches are not made in these odd sizes. Thus, a balanced ratio of the number of components is not easily maintained as the system grows by, say ten percent, or in any other small, odd-sized increment, either.

The invention can and does provide growth possibilities which tend to closely maintain a balance of network accommodations. As will become more apparent, if one crossbar switch is added to the network, there is simultaneously added a balanced number of new line inlets, verticals, junctors, and outlets in a ratio which maintains a balance between these equipments and the number of inlets which are added. Moreover, this balance is maintained between the previous and added equipments without any rewiring or other redistributing of existing equipments, connections, or crosspoints. While the foregoing speaks of "adding" equipment to "existing" equipment, it must be understood that the problem is the same whenever a system originally designed for one capacity is changed to provide a new or different capacity. If one system is designed using a given number of equipments and the next following system is designed to be, say ten percent larger, the design problems are essentially the same as they would be if the first system were an existing system which is enlarged by the same ten percent of add-on equipment. Therefore, the terms "enlarged" or "added" are used in this specification and in the appended claims with a generic meaning, and they are to be construed broadly enough to cover all modifications which fall within the true spirit of the invention.

Figure 2:
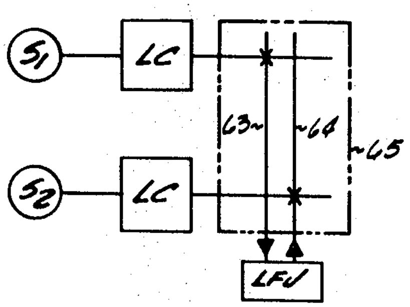
Figure 3:
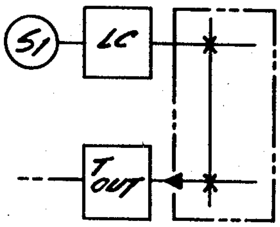

In FIG. 2 (and elsewhere) the outlets at the most concentrated end of the network are shown as having a line feed junctor LFJ or a trunk connected thereto. Sometimes, line feed junctors are also called intra-office trunks. Their function is to furnish talking battery to both calling and called subscribers, to hold the connection during a call, and to release the connection at the end of the call. Trunks are used to extend the calls in any desirable manner. These particular showings of line feed junctors and trunks are given here by way of example, only. They could represent any suitable equipment, such as markers, registers, senders, etc., according to the system needs.

Conceptually, the inventive manner of accomplishing the balanced and uniform growth of network size is shown by FIGS. 2–5. More specifically, FIG. 2 shows that if both the calling and called subscribers lines, and the necessary controls are connected to the same verticals 63, 64 in a single crossbar switch 65, only two verticals are required to complete a call from a calling line to a feed junctor LFJ, and then to a called line. Every switch added to a switching network, simultaneously introduces a number of subscriber line inlets, verticals to serve the lines, and outlets to the control equipments. If the two subscriber lines are not connected to the same vertical, the call is extended to outgoing equipment, such as the trunk circuit $T_{out}$ (FIG. 3) and then to another vertical having the called line connected thereto. Here, again, the point is that each crossbar switch added to the network simultaneously adds a balanced number of inlets, outlets, crosspoints, junctors and connections to other switching stages.

Figure 4:
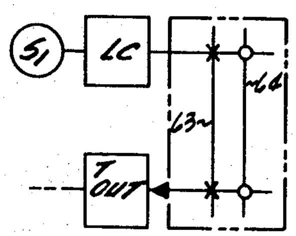
Figure 5:
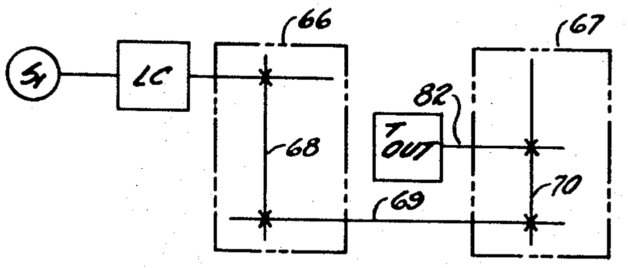

The number of verticals and inter-vertical wiring required by the system is also supplied in the proper ratio to maintain a balanced growth pattern. For example, a traffic study has shown that if there is only one vertical capable of making a single vertical connection between any appropriate two groups of wires and if it is always seized first so that it then becomes unavailable to another call between the same two groups of wires, the percentage of calls (about 15%) completed over a single vertical is very small. On the other hand, the percentage of calls which may be completed via a single vertical rises sharply to become approximately 50%–80% (for the same traffic pattern) if two verticals having duplicate connections are provided, as shown in FIG. 4. If a call between two wires in one group of wires is completed over vertical 63, the vertical 64 is still available for another call in the same group of wires having access to the same verticals. By the time that a third call occurs in this same group of wires, there is an excellent probability that one of the first two calls will have ended. Thus, a traffic study clearly indicates how many verticals and junctors are required to be included in each switch in order to maintain the growth pattern with a desired ratio of equipments. If the available line and trunk appearances are on different switches 66, 67 (FIG. 5), it is obvious that the call cannot be completed on a single vertical regardless of the number of alternative paths which are supplied. Instead, the calling line S1 uses the vertical 68 to gain access to inter-vertical wiring (such as junctor 69) which is in position to be connected to the verticals of all switches. The switch 67 then operates its crosspoints to complete a connection from the selected junctor 69 through the vertical 70 to the called trunk circuit $T_{out}$.

A review of FIGS. 1–5 should make it plain that the prior art system (FIG. 1) requires the junctors, verticals and other equipment to be distributed in a predetermined ratio and that the addition of every line, switch, or other piece of equipment tends to change the ratio of all equipments in the system. Thus, smooth growth is difficult or impossible to maintain. Contrast this with the invention which maintains a balance ratio in the number of equipments appearing at various parts of the network regardless of the number of inlets that are added.

Figure 6:
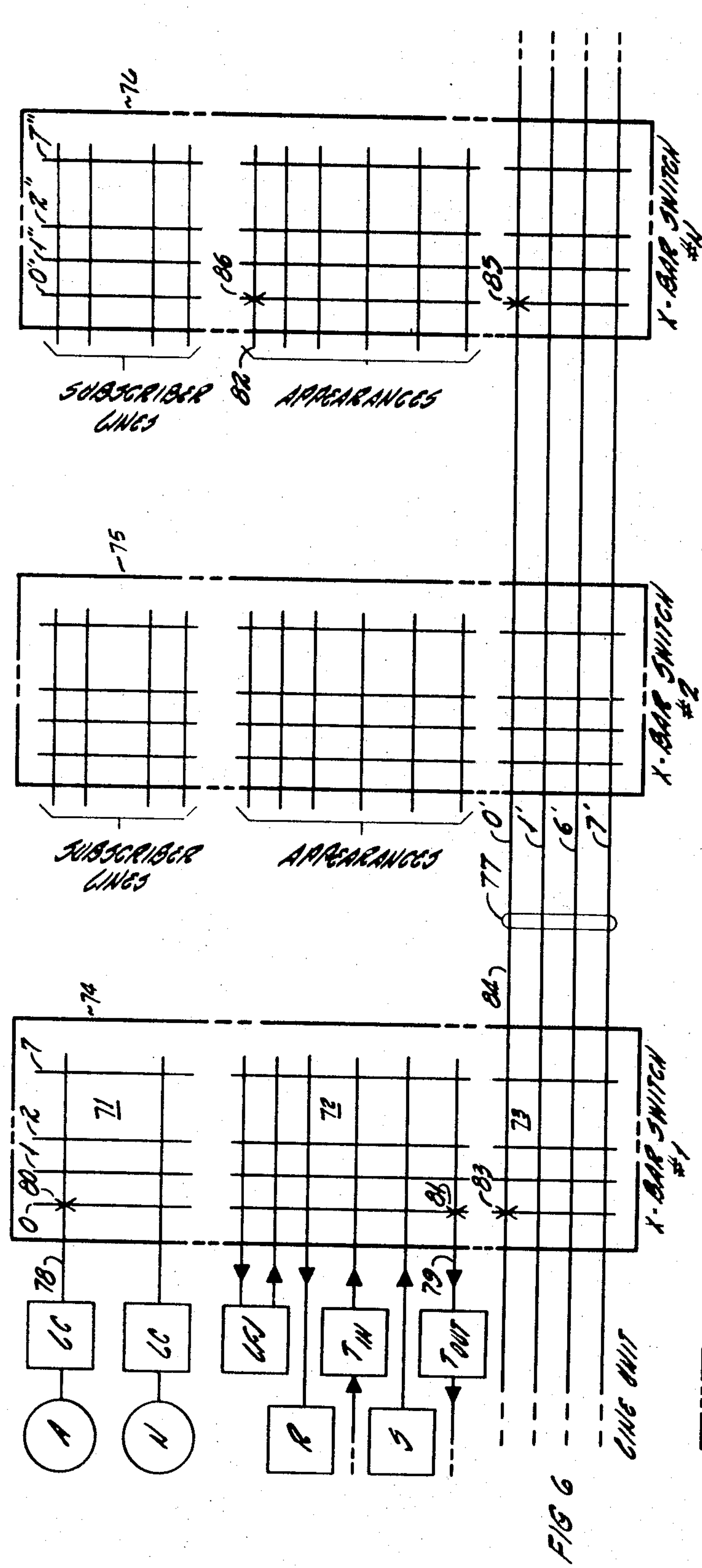
FIG. 6 is a simplified layout of the crossbar matrix which explains how the system may be made in any size while retaining an optimum mix of equipment.

In keeping with an aspect of this invention, the switching network for maintaining these balanced growth characteristics uses a plurality of crossbar switches having split verticals arranged to provide three electrically isolated groups of crosspoints, as at 71, 72, 73 (FIG. 6). The first group of crosspoints 71 form the inlets or entrance points for switch paths to be extended through the network. The second group of crosspoints 72 form the outlets or exit points of these switch paths as they leave the network. The subscriber lines are connected to the inlets and the control circuits such as trunks, registers, senders, and the like, are connected to the outlets. The third group of crosspoints 73 include intra-network connections providing the common links or junctors 77 which enable the completion of alternative paths through the network. Thus, the number of inlets, outlets, verticals, and junctors are added in the predetermined ratio which maintains a balanced growth as the number of crossbar switches increases.

FIG. 6 shows how three exemplary crossbar switches 74–76 are wired together by junctors 77 to provide a single switching unit. There is at least one of these junctor wires extending from each crossbar switch vertical to every other vertical in the switching unit; the exact number of such junctor wires is ascertained from a traffic study. By way of example, if a path is demanded from inlet 78 to outlet 79, the call could be completed (as described by FIG. 3) via the single vertical including the crosspoints 80, 81. On the other hand, if an inlet at point 78 must be connected to an outlet at point 82, one of many possible paths (as described by FIG. 5) extends from the inlet point 78 through crosspoints 80, 83, junctor 84, and crosspoints 85, 86 to exit 82. Only a few exemplary paths and crosspoints are shown here; however, it should be understood that there are many other alternative paths. Regardless of the numbers of equipments which are used, the ratio between alternate paths, subscriber lines, and appearances does not change appreciably by an inclusion of the three switches shown here because each switch carries the same number of inlets, outlets, crosspoints and junctors distributed in the same ratio.

Figure 7:
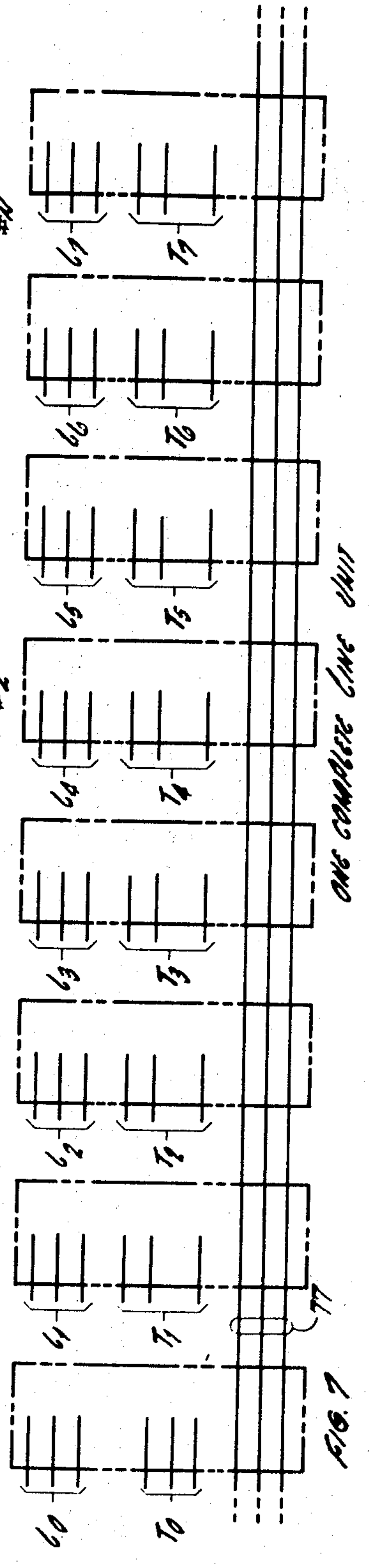
FIG. 7 shows how a number of crossbar switches may be joined together to give an economically smooth and uniform network growth characteristic for a line unit.

FIG. 7 shows how these principles may be used to further enlarge the network by joining together eight crossbar switches to form a complete "line unit." Any line in any inlet group L0 . . . L7 may be connected to any trunk in any outlet group T0 . . . T7 via the junctors 77. The ratio of inlets, outlets, and crosspoints is the same for FIGS. 6 and 7.

There are, however, practical limits to the number of switches that can be added when the junctors 77 provide the entire connections to every vertical in the network. After the network grows beyond the largest practical scale, wherein it is possible to link every switch to every other switch via every junctor wire (as shown at 77 in FIG. 7), the invention system begins to spread its junctors on a more specialized basis. This specialization is required because, if every switch in the entire network is wired together by every junctor as shown in FIG. 7, a junctor used to extend a connection between any two verticals would become unavailable for extending connections between any other two verticals, however remote. Thus, any disruptive effects upon traffic anywhere in the network would be felt as a general degeneration of the traffic handling capability in every switch in the entire network.

Figures 8, 9:
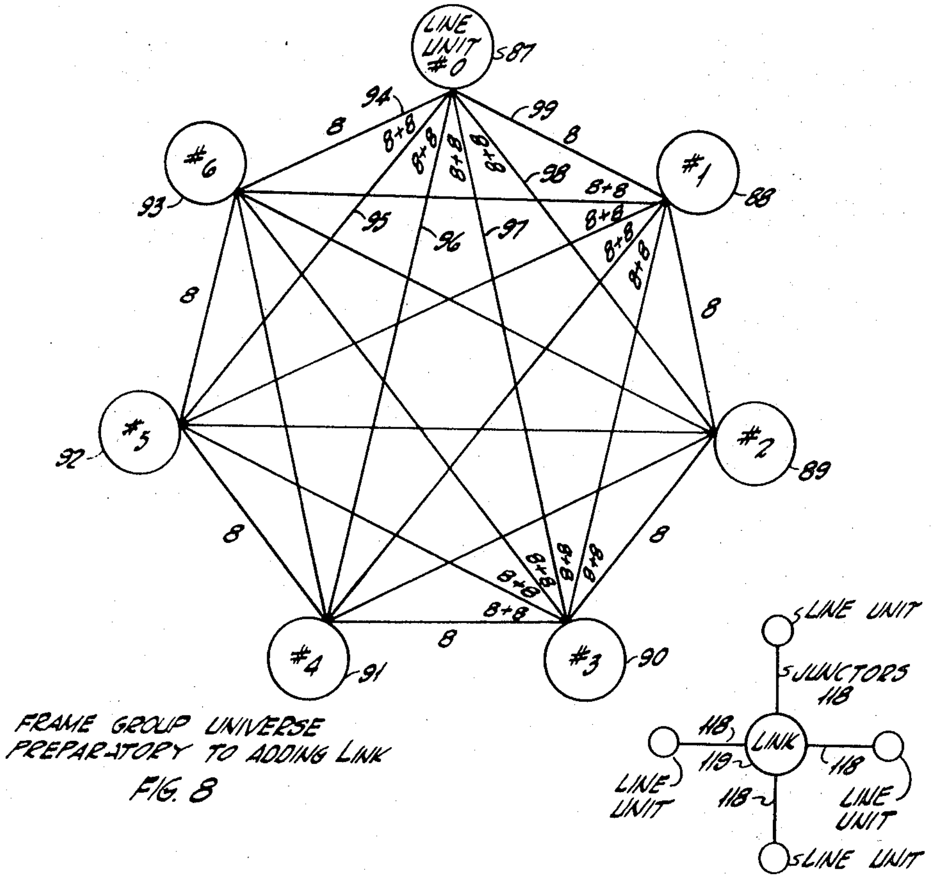
FIG. 8 is another layout showing how a number of the line units of FIG. 7 may be connected together to give a further economically smooth and uniform growth characteristic after the system has exceeded the size which can be made as taught by FIG. 7.
FIG. 9 is still another layout showing how the system may economically and uniformly grow to achieve an even larger size after it has exceeded the maximum efficient size of growth that is possible in the pattern of FIG. 8.

Accordingly, the next larger system uses a "frame group" (as shown in FIG. 8) for combining up to seven of the line units shown in FIG. 7, thereby providing a system having a maximum total of fifty-six crossbar switches. More particularly, the circle 87 (for example) represents the eight switch line unit of FIG. 7. Six other identical line units are shown in FIG. 8 by similar circles 88, 89, 90, 91, 92, 93, thus completing the total of up to fifty-six switches. To provide for a more effective and efficient use of the paths, the junctors 77 are extended in groups to various line units. Thus, if ninety-six junctors 77 are divided into six equal groups 94, 95, 96, 97, 98, 99 of sixteen junctors each, each group of junctors is extended between two of the line units 87–93 as shown in FIG. 8. A simple count of the lines in FIG. 8 discloses that there are twenty-one entirely different groups of sixteen junctors or a total of three hundred and thirty-six possible paths. Those familiar with traffic studies required to make trunk grading patterns will recognize how to distribute these junctors.

Figure 10:
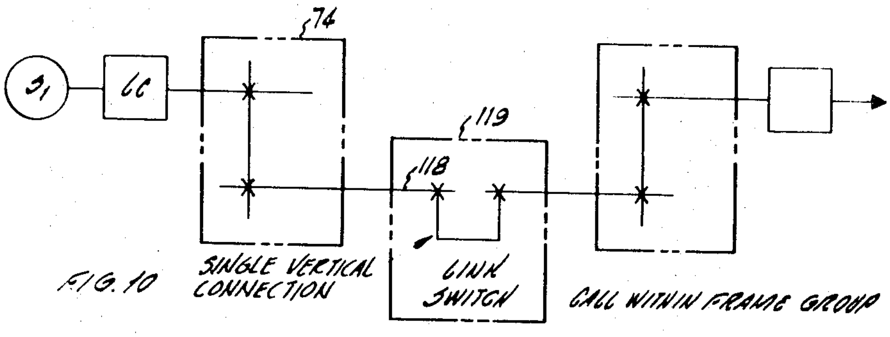
FIGS. 10 and 11 show the switch paths resulting when a system is constructed according to the principles of FIG. 9.
Figure 11:
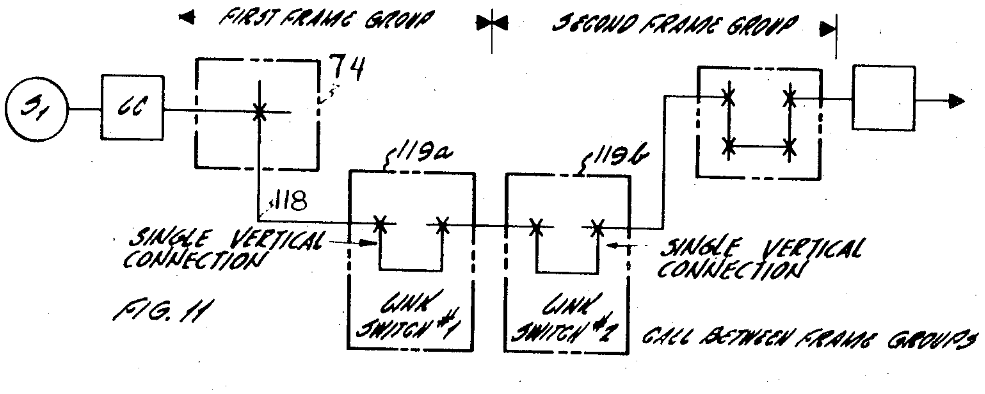

After the system grows beyond the economical scale available from a seven line unit group of FIG. 8, still further added capacity may be provided by adding link stage junctors 118 and inserting another switching stage, here called a link stage 119. As shown in FIG. 9, the link stage is reacted via the junctors of the various switches in the line units. It would require a somewhat greater effort to add the link stage to existing equipment than it would to added switches to the line units or frame groups. However, the link can be added without greatly disrupting the service in an existing system, and it can be added to new equipment in a factory with only a very small effort. Once the slight growth discontinuity resulting from the addition of the link stage 119 has been overcome, the network may continue to grow in a substantially smooth and uniform manner by the expedient of adding further switches and line units. This uniformity of growth after the addition of the link stage should become more apparent from a study of FIGS. 10 and 11. In each case, a subscriber line S1 is shown as being connected to a crossbar switch 74 (which is the same as the switch 74, FIG. 6). The junctors 118 (which are similar to the junctors 77, FIG. 6) make a connection to the link stage 119 where a single vertical may be used to complete the connections, as taught in FIGS. 2–4. As the system becomes even larger, two link stages 119_a_, 119_b_ may be used as taught in FIG. 11. Hence, it is seen that each added link stage switch results in a simultaneous addition of a balanced number of inlets, outlets, verticals, junctors and crosspoints.

The invention has many advantages which should be apparent to those skilled in the art. Primarily, these are the advantages which grow out of the ability of the system to grow smoothly and economically by the simple expedient of adding more switches. As each switch is added, a balanced number of inputs, outputs, crosspoints, junctors, etc., are also added in the same predetermined ratio. Therefore, there never is an unfavorable imbalance of equipments.

While the principles of the invention have been described above in connection with specific apparatus and applications, it is to be understood that this description is made only by way of example and not as a limitation on the scope of the invention.

We calim:

1. A crossbar switching network comprising a plurality of crossbar switches, means for interconnecting said switches to form a network having inlets and outlets with junctors therebetween, each of said switches having a balanced number of crosspoint appearances for said network of inlets, outlets and junctors, whereby any number up to a predetermined number of said switches may be assembled together without substantially changing the ratio of said inlet, outlet and junctor appearances, each of said switches comprising a field of crosspoints divided into three sections by split verticals, a first of said sections comprising means for selectively connecting said inlets to the verticals thereof by the operation of crosspoints, a second of said sections comprising means for selectively connecting said outlets to the verticals thereof by the operation of crosspoints, and a third of said sections comprising means for connecting said junctors to the verticals thereof by the operation of crosspoints, means for selectively joining said split verticals to provide selective paths between the inlets on the first split vertical section and the outlets on the second split vertical section, or between the inlets on said first split vertical section and the junctors on said third split vertical section, and means for interconnecting said crossbar switches in said network using the junctors selectively connected to said third vertical section.

2. The network of claim 1 wherein said junctors are connected to horizontal bars on said crossbar switch which are connected to the verticals only through the operation of a selected crosspoint.

3. The network of claim 1 and means comprising a link switching stage for interconnecting said junctors when the number of said switches exceeds said predetermined number.

References Cited

UNITED STATES PATENTS

| | | | |
|---|---|---|---|
| 3,156,780 | 11/1964 | Browell et al. | 179—22 |
| 3,127,480 | 3/1964 | Ek et al. | 179—22 |

FOREIGN PATENTS

| | | |
|---|---|---|
| 757,025 | 9/1956 | Great Britain. |

WILLIAM C. COOPER, Primary Examiner